(12) United States Patent
Ishihara et al.

(10) Patent No.: US 9,956,716 B2
(45) Date of Patent: May 1, 2018

(54) MULTILAYERED CONTAINER

(71) Applicant: Toyo Seikan Kaisha, Ltd., Tokyo (JP)

(72) Inventors: Takayuki Ishihara, Kanagawa (JP); Atsushi Kikuchi, Kanagawa (JP); Hiroaki Gotou, Kanagawa (JP); Shinji Tanaka, Kanagawa (JP); Kengo Matsumoto, Kanagawa (JP)

(73) Assignee: TOYO SEIKAN KAISHA, LTD., Tokyo (JP)

( * ) Notice: Subject to any disclaimer, the term of this patent is extended or adjusted under 35 U.S.C. 154(b) by 630 days.

(21) Appl. No.: 14/523,843

(22) Filed: Oct. 24, 2014

(65) Prior Publication Data
US 2015/0042020 A1 Feb. 12, 2015

Related U.S. Application Data

(63) Continuation of application No. 12/518,813, filed as application No. PCT/JP2007/073449 on Dec. 5, 2007, now abandoned.

(30) Foreign Application Priority Data

Dec. 11, 2006 (JP) .................. 2006-333358

(51) Int. Cl.
| | |
|---|---|
| B29C 51/10 | (2006.01) |
| B32B 27/18 | (2006.01) |
| B32B 27/30 | (2006.01) |
| B32B 27/32 | (2006.01) |
| B29C 51/00 | (2006.01) |
| B29C 51/14 | (2006.01) |
| B65D 81/26 | (2006.01) |
| B29K 23/00 | (2006.01) |
| B29L 31/00 | (2006.01) |

(52) U.S. Cl.
CPC ............ *B29C 51/10* (2013.01); *B29C 51/002* (2013.01); *B29C 51/14* (2013.01); *B32B 27/18* (2013.01); *B32B 27/30* (2013.01); *B32B 27/306* (2013.01); *B32B 27/32* (2013.01); *B29K 2023/08* (2013.01); *B29K 2023/086* (2013.01); *B29K 2023/12* (2013.01); *B29K 2023/14* (2013.01); *B29K 2995/0067* (2013.01); *B29L 2031/712* (2013.01); *B32B 2250/03* (2013.01); *B32B 2250/246* (2013.01); *B32B 2250/42* (2013.01); *B32B 2307/7244* (2013.01); *B32B 2439/00* (2013.01); *B32B 2439/40* (2013.01); *B32B 2439/70* (2013.01); *B32B 2439/80* (2013.01); *B65D 81/26* (2013.01); *Y10T 428/1383* (2015.01)

(58) Field of Classification Search
None
See application file for complete search history.

(56) References Cited

U.S. PATENT DOCUMENTS

| | | | |
|---|---|---|---|
| 5,230,934 | A | 7/1993 | Sakano et al. |
| 7,608,340 | B2 | 10/2009 | Tsuji et al. |
| 7,893,145 | B2 | 2/2011 | Inubushi et al. |
| 2005/0153087 | A1 | 7/2005 | Tsuji et al. |
| 2006/0251838 | A1 | 11/2006 | Inoue et al. |

FOREIGN PATENT DOCUMENTS

| | | |
|---|---|---|
| EP | 0 548 420 A1 | 6/1993 |
| EP | 1 464 482 A1 | 10/2004 |
| EP | 1 538 176 A1 | 6/2005 |
| EP | 1 604 902 A1 | 12/2005 |
| JP | 4-270654 A | 9/1992 |
| JP | 2003-334906 A | 11/2003 |
| JP | 2004-196337 A | 7/2004 |
| JP | 2004-268977 A | 9/2004 |
| JP | 2005-187808 A | 7/2005 |

OTHER PUBLICATIONS

International Search Report for PCT/JP2007/073449 (in Japanese and in English), dated Feb. 2008.
Written Opinion of the International Searching Authority for PCT/JP2007/073449 (in Japanese and in English), dated Feb. 2008.
Communication dated Jan. 30, 2012, with extended European Search Report for European Application No. 07850091.5.

*Primary Examiner* — Monica Huson
(74) *Attorney, Agent, or Firm* — Hoffmann & Baron, LLP

(57) ABSTRACT

Disclosed is a multilayered container having an intermediate layer comprising an oxygen-absorbable barrier resin composition showing excellent processability upon molding. Specifically disclosed is a multilayered container which comprises an inner layer and an outer layer each comprising an olefin resin and an intermediate layer provided between the inner layer and the outer layer and comprising an oxygen-absorbable barrier resin composition, wherein the oxygen-absorbable barrier resin composition has a cooling crystallization peak temperature lower than that of a base resin (an oxygen barrier resin) which constitutes the oxygen-absorbable barrier resin composition, the multilayered container is formed by a solid-phase-forming process at a temperature lower by 1 to 15° C. than the cooling crystallization starting temperature (Tc2) of the base resin, and the body of the container shows a calorific value of less than 0.5 J/g by the isothermal crystallization after heating from 30° C. to 130° C. at a heating rate of 100° C./min in a thermal analysis of the body.

4 Claims, No Drawings

MULTILAYERED CONTAINER

CROSS-REFERENCE TO RELATED APPLICATIONS

This application is a continuation of U.S. patent application Ser. No. 12/518,813, filed Jun. 11, 2009, and afforded a 371(c) date of Jun. 11, 2009, which is the National Stage of International Application No. PCT/JP2007/073449, filed Dec. 5, 2007, which claims the benefit of Japanese Application No. 2006-333358, filed Dec. 11, 2006, the contents of all of which are incorporated by reference herein.

FIELD OF THE INVENTION

The present invention relates to a multilayered container having an intermediate layer consisting of an oxygen-absorbing barrier resin composition which is excellent in molding processability.

BACKGROUND OF THE INVENTION

An oxygen barrier resin such as an ethylene-vinyl alcohol copolymer (EVOH) is used as a resin which is layered on a layer of a thermoplastic resin such as a polyolefin to form a multilayered container (refer to Patent Document 1).

In molding a multilayered sheet which employs the oxygen barrier resin such as the ethylene-vinyl alcohol copolymer as an intermediate layer, a solid-phase forming is adopted from the viewpoint of improvement in transparency and mechanical properties. However, such solid-phase forming has problems such as tearing and uneven thickness of the oxygen barrier resin layer.

Patent Document 1: Japanese Patent Application Publication No. 2005-187808

SUMMARY OF THE INVENTION

An object of the present invention is to provide a multilayered container including an intermediate layer consisting of an oxygen-absorbing barrier resin composition which is excellent in solid-state molding processability.

The present invention provides a multilayered container comprising: an inner layer including an olefin resin; an outer layer including an olefin resin; and an intermediate layer provided between the inner layer and the outer layer and consisting of an oxygen-absorbing barrier resin composition, wherein a cooling crystallization peak temperature of the oxygen-absorbing barrier resin composition is lower than that of a base resin (an oxygen barrier resin) of the oxygen-absorbing barrier resin composition, the multilayered container is solid-phase formed in a temperature range (T) which is lower by 1 to 15° C. than a cooling crystallization starting temperature (Tc2) of the base resin, and, a thermal analysis of a body portion of the container shows that an amount of heat released during isothermal crystallization after a temperature raise from 30° C. to 130° C. at 100° C./rain is less than 0.5 J/g.

The multilayered container of the present invention makes it possible to obtain a multilayered container including an intermediate layer consisting of an oxygen-absorbing barrier resin composition which is excellent in solid-state molding processability.

DETAILED DESCRIPTION

A multilayered container of the present invention includes an inner layer including an olefin resin, an outer layer including an olefin resin and an intermediate layer consisting of an oxygen-absorbing barrier resin composition.

Examples of the olefin resins include: polyethylenes (PE) such as low density polyethylene (LDPE), medium density polyethylene (MDPE), high density polyethylene (HDPE), linear low density polyethylene (LLDPE), and linear very low density polyethylene (LVLDPE); polypropylene (PP); an ethylene-propylene copolymer; polybutene-1; an ethylene-butene-1 copolymer; a propylene-butene-1 copolymer; an ethylene-propylene-butene-1 copolymer; an ethylene-vinyl acetate copolymer; an ion-crosslinked olefin copolymer (ionomer); and a blended material thereof.

Examples of the gas barrier resin include an ethylene-vinyl alcohol copolymer, a polyamide resin, and a polyester resin. These resins may be used alone or in combination of two or more.

In the present invention, the ethylene-vinyl alcohol copolymer is desirably used as a resin which is particularly excellent in barrier properties against oxygen and flavor components. As the ethylene-vinyl alcohol copolymer, any publicly-known ethylene-vinyl alcohol copolymer can be used. For example, a saponified copolymer obtained by saponifying an ethylene-vinyl acetate copolymer having an ethylene content of 20 to 60 mol %, particularly 25 to 50 mol %, so that the saponification degree can be 96 mol % or more, particularly 99 mol % or more can be used.

This ethylene-vinyl alcohol saponified copolymer needs to have a molecular weight enough to allow the saponified copolymer to be formed into a film. Generally, the ethylene-vinyl alcohol saponified copolymer has a viscosity of desirably 0.01 dL/g or more, particularly desirably 0.05 dL/g or more, the viscosity being determined in a mixture solvent with a weight ratio of 85:15 of phenol to water, at 30° C.

Examples of the polyamide resin include: (a) an aliphatic, alicyclic or semi-aromatic polyamide derived from a dicarboxylic acid component and a diamine component; (b) a polyamide derived from an aminocarboxylic acid or a lactam of an aminocarboxylic acid; a copolyamide thereof; and a blended material thereof.

Examples of the dicarboxylic acid component include: an aliphatic dicarboxylic acid having 4 to 15 carbon atoms, such as succinic acid, adipic acid, sebacic acid, decanedicarboxylic acid, undecanedicarboxylic acid, or dodecanedicarboxylic acid; and an aromatic dicarboxylic acid such as terephthalic acid or isophthalic acid.

Meanwhile, examples of the diamine component include: a linear- or branched-chain alkylenediamine having 4 to 25 carbon atoms, particularly 6 to 18 carbon atoms, such as 1,6-diaminohexane, 1,8-diaminooctane, 1,10-diaminodecane, or 1,12-diaminododecane; an alicyclic diamine such as a bis(aminomethyl)cyclohexane, bis(4-aminocyclohexyl) methane, or 4,4'-diamino-3,3'-dimethyldicyclohexylmethane, or particularly bis(4-aminocyclohexyl)methane, 1,3-bis (aminocyclohexyl)methane, or 1,3-bis(aminomethyl) cyclohexane; and an aromatic-aliphatic diamine such as m-xylylenediamine and/or p-xylylenediamine.

Examples of the aminocarboxylic acid component include an aliphatic aminocarboxylic acid such as, ω-aminocaproic acid, ω-aminooctanoic acid, ω-aminoundecanoic acid, or ω-aminododecanoic acid; and an aroma-aliphatic aminocarboxylic acid such as para-aminomethylbenzoic acid, or para-aminophenylacetic acid.

Of these polyamides, polyamides containing xylylene groups are preferable, and specific examples thereof include: a homopolymer such as poly-meta-xylylene adipamide, poly-meta-xylylene sebacamide, poly-meta-xylylene suberamide, poly-para-xylylene pimelamide, or poly-meta-xylylene azelamide; a copolymer such as a meta-xylylene/ para-xylylene adipamide copolymer, a meta-xylylene/para-xylylene pimelamide copolymer, a meta-xylylene/para-xylylene sebacamide copolymer or a meta-xylylene/para-xylylene azelamide copolymer; a copolymer obtained by copolymerizing components of these homopolymers or these copolymers with an aliphatic diamine such as hexamethylenediamine; an alicyclic diamine such as piperazine; an aromatic diamine such as para-bis(2-aminoethyl)benzene, an aromatic dicarboxylic acid such as terephthalic acid, a lactam such as ϵ-caprolactam, an ω-aminocarboxylic acid such as 7-aminoheptanoic acid, an aromatic aminocarboxylic acid such as para-aminomethyl benzoic acid; or the like. Particularly, a polyamide obtained from a diamine component mainly containing m-xylylenediamine and/or p-xylylenediamine and an aliphatic dicarboxylic acid and/or an aromatic dicarboxylic acid can be suitably used.

These polyamides containing xylylene groups are superior in gas barrier properties to other polyamide resins, and thus preferable for achieving the object of the present invention.

As for the polyamide in the present invention, a polyamide resin having a terminal amino group concentration of 40 eq/106 g or more, particularly having a terminal amino group concentration exceeding 50 eq/106 g is preferable from the viewpoint of suppressing the oxidative degradation of the polyamide resin.

Oxidative degradation, i.e., oxygen absorption, of a polyamide resin, and the terminal amino group concentration of the polyamide resin have close relationship to each other. Specifically, when the terminal amino group concentration of a polyamide resin is within the above-described range which is relatively high, the oxygen absorption rate is reduced to a value of almost zero or close to zero. In contrast, if the terminal amino group concentration of a polyamide resin falls below the above-described range, the oxygen absorption rate of the polyamide resin tends to increase.

These polyamides also need to have molecular weights enough to allow the polyamides to be formed into films, and the relative viscosity (ηrel) thereof determined at a concentration of 1.0 g/dl in sulfuric acid and at a temperature of 30° C. is desirably 1.1 or more, particularly desirably 1.5 or more.

Examples of the polyester resin include a so-called gas barrier polyester, which is a thermoplastic polyester derived from an aromatic dicarboxylic acid such as terephthalic acid and isophthalic acid and a diol such as ethylene glycol. The gas barrier polyester contains, in its polymer chain, a terephthalic acid component (T) and an isophthalic acid component (I) in a molar ratio of:

T:I=95:5 to 5:95,
particularly, 75:25 to 25:75, and
an ethylene glycol component (E) and a bis(2-hydroxyethoxy)benzene component (BHEB) in a molar ratio of:
E:BHEB=99.999:0.001 to 2.0:98.0,
particularly, 99.95:0.05 to 40:60.

As the BHEB, 1,3-bis(2-hydroxyethoxy)benzene is preferable.

This polyester needs to have a molecular weight at least enough to allow the polyester to be formed into a film, and generally the polyester has an intrinsic viscosity [η] of desirably 0.3 to 2.8 dl/g, particularly desirably 0.4 to 1.8 dl/g, the intrinsic viscosity being determined in a mixture solvent with a weight ratio of 60:40 of phenol to tetrachloroethane at a temperature of 30° C.

A polyester resin mainly made of polyglycol acid, or a polyester resin obtained by blending this polyester resin with a polyester resin derived from the above-described aromatic dicarboxylic acid and the above-described diol also can be used.

The oxygen-absorbing barrier resin composition preferably includes an oxidizable polymer. Here, the oxidizable polymer represents a polymer which exhibits an oxygen-absorbing function by being oxidized.

Examples of the oxidizable polymer include an oxidizable polymer having unsaturated ethylenic bonds and the like, and the oxidizable polymer is, for example, derived by using a polyene as a monomer. Appropriate examples of the polyene include conjugated dienes such as butadiene and isoprene. A homopolymer of a polyene; or a random or block copolymer of a combination of two kinds or more of the above-described polyenes or of a combination of the above-described polyene with a monomer other than the polyene, or the like can be used as the oxidizable polymer. Among the polymers derived from polyenes, polybutadiene, polyisoprene, natural rubber, nitrile-butadiene rubber, styrene-butadiene rubber, chloroprene rubber, ethylene-propylene-diene rubber and the like are suitable, however, as a matter of course, the oxidizable polymer is not limited thereto.

In addition, the oxidizable polymer having unsaturated ethylenic bonds preferably has a functional group. Examples of the functional group include a carboxylic acid group, a carboxylic anhydride group, a carboxylic acid ester group, a carboxylic acid amide group, an epoxy group, a hydroxy group, an amino group, a carbonyl group and the like. The carboxylic acid group and the carboxylic anhydride group are particularly preferable from the viewpoint of compatibility and the like. These functional groups may be located in a side chain of the resin or a terminal of the resin.

Examples of monomer used to introduce these functional groups include ethylenic unsaturated monomers each having the corresponding one of the above-described functional groups.

As a monomer used to introduce a carboxylic acid group or a carboxylic anhydride group into an oxidizable polymer having unsaturated ethylenic bonds, an unsaturated carboxylic acid or a divertive thereof is desirably used, and specific examples thereof include: an α,β-unsaturated carboxylic acid such as acrylic acid, methacrylic acid, maleic acid, fumaric acid, itaconic acid, citraconic acid, or tetrahydrophthalic acid; an unsaturated carboxylic acid such as bicyclo[2,2,1]hepto-2-ene-5,6-dicarboxylic acid; an α,β-unsaturated carboxylic acid anhydride such as maleic anhydride, itaconic anhydride, citraconic anhydride, or tetrahydrophthalic anhydride; and an unsaturated carboxylic acid anhydride such as bicyclo[2,2,1]hepto-2-ene-5,6-dicarboxylic acid anhydride.

The acid modification of the oxidizable polymer having unsaturated ethylenic bonds is carried out by using the oxidizable polymer having unsaturated ethylenic bonds as the base polymer, and by graft-copolymerization of an unsaturated carboxylic acid or a derivative thereof to the base polymer by use of a means known per se. Alternatively, the acid modification of the oxidizable polymer having unsaturated ethylenic bonds can be produced by random-copolymerization of the above-mentioned oxidizable polymer having unsaturated ethylenic bonds and an unsaturated carboxylic acid or a derivative thereof.

An oxidizable polymer having unsaturated ethylenic bonds and having a carboxylic acid group or a carboxylic anhydride group particularly suitable from the viewpoint of dispersibility to the oxygen barrier resin is preferably a liquid resin containing a carboxylic acid or a derivative thereof in an amount to give an acid number of 5 KOH mg/g or more.

When the content of the unsaturated carboxylic acid or the derivative thereof is within the above-described range, the oxidizable polymer having unsaturated ethylenic bonds is favorably dispersed in the oxygen barrier resin, and the oxygen absorption is also performed smoothly.

When the oxidizable polymer having unsaturated ethylenic bonds is blended into the oxygen barrier resin, 1 g of the oxidizable polymer having unsaturated ethylenic bonds is preferably capable of absorbing $2 \times 10^{-3}$ mol or more, particularly $4 \times 10^{-3}$ mol or more of oxygen in the presence of a transition metal catalyst at a normal temperature. In other words, when the oxygen-absorbing capability is the above-described value or more, it is unnecessary to blend a large amount of the oxidizable polymer having unsaturated ethylenic bonds into the oxygen barrier resin in order to cause favorable oxygen barrier properties to be exhibited. Accordingly, this results in no reduction in processability and moldability of the resin composition into which the oxidizable polymer having unsaturated ethylenic bonds is blended.

The carbon-carbon double bond in the oxidizable polymer having unsaturated ethylenic bonds used in the present invention is not particularly limited. The carbon-carbon double bond may be located in the main chain in a form of a vinylene group, or may be located in a side chain in a form of a vinyl group. In short, the carbon-carbon double bond only needs to be oxidizable.

The oxidizable polymer having unsaturated ethylenic bonds is preferably contained in the range of 1 to 30% by weight, particularly 3 to 20% by weight relative to the oxygen-absorbing barrier resin composition. When the blended amount of the oxidizable polymer having unsaturated ethylenic bonds is within the above-described range, the resulting oxygen-absorbing layer has a sufficient oxygen-absorbing capability, and the moldability of the resin composition can be maintained.

The oxygen-absorbing barrier resin composition preferably includes an oxidation catalyst.

Preferable examples of the oxidation catalyst include transition metal catalysts containing a group VIII metal component of the periodic table, such as iron, cobalt and nickel. In addition, other examples include transition metal catalysts containing: a group I metal component such as copper and silver; a group IV metal component such as tin, titanium and zirconium; and a group V metal component such as vanadium, a group VI metal component such as chromium, and a group VII metal component such as manganese. Of these metal components, the cobalt component has a high oxygen absorption rate, and thus particularly suitable for achieving the object of the present invention.

The transition metal catalyst is used generally in a form of a low valent inorganic acid salt, a low valent organic acid salt or a low valent complex salt of the above-described transition metal.

Examples of the inorganic acid salt include: halides such as a chloride; sulfur oxyacid salts such as a sulfate; nitrogen oxyacid salts such as a nitrate; phosphorus oxyacid salts such as a phosphate; a silicate; and the like.

Meanwhile, examples of the organic acid salt include a carboxylate, a sulfonate, and a phosphonate. A carboxylate is suitable for achieving the object of the present invention, and specific examples thereof include transition metal salts of acetic acid, propionic acid, propionic acid, butanoic acid, isobutanoic acid, pentanoic acid, isopentanoic acid, hexanoic acid, heptanoic acid, isoheptanoic acid, octanoic acid, 2-ethylhexanoic acid, nonanoic acid, 3,5,5-trimethylhexanoic acid, decanoic acid, neodecanoic acid, undecanoic acid, lauric acid, myristic acid, palmitic acid, margaric acid, stearic acid, arachic acid, linderic acid, tsuzuic acid, petroselinic acid, oleic acid, linoleic acid, linolenic acid, arachidonic acid, formic acid, oxalic acid, sulfamic acid, naphthenic acid and the like.

On the other hand, a complex with β-diketone or β-keto acid ester is used as the complex of the transition metal, and examples of the β-diketone and the β-keto acid ester usable herein include acetyl acetone, ethyl acetoacetate, 1,3-cyclohexadione, methylene-bis-1,3-cyclohexadione, 2-benzyl-1, 3-cyclohexadione, acetyl tetralone, palmitoyl tetralone, stearoyl tetralone, benzoyl tetralone, 2-acetyl cyclohexanone, 2-benzoyl cyclohexanone, 2-acetyl-1,3-cyclohexanedione, benzoyl-p-chlorobenzoylmethane, bis(4-methylbenzoyl)methane, bis(2-hydroxybenzoyl)methane, benzoylacetone, tri-benzoylmethane, diacetylbenzoylmethane, stearoylbenzoylmethane, palmitoylbenzoylmethane, lauroylbenzoylmethane, dibenzoylmethane, bis(4-chlorobenzoyl)methane, bis(methylene-3,4-dioxybenzoyl)methane, benzoylacetylphenylmethane, stearoyl(4-methoxybenzoyl)methane, butanoylacetone, distearoylmethane, acetylacetone, stearoylacetone, bis(cyclohexanoyl)methane, dipivaloylmethane and the like.

Those skilled in the art can easily set the content of the above-mentioned oxidizable polymer having unsaturated ethylenic bonds to make the above-described cooling crystallization peak temperature lower than that of the base resin. Generally, the content is 1 to 30% by weight, preferably 3 to 20% by weight, relative to the total weight of the oxygen-absorbing barrier resin composition.

Those skilled in the art can also easily set the content of the oxidation catalyst to make the above-described cooling crystallization peak temperature lower than that of the base resin. Generally, the content is 100 to 1000 ppm, preferably 200 to 500 ppm, in terms of the amount of metal, relative to the total weight of the oxygen-absorbing barrier resin composition.

The oxygen-absorbing barrier resin composition may be a blended material of the oxygen barrier resin and the oxidizable polymer. Alternatively, the oxygen-absorbing barrier resin composition may be blended with an additive such as a nucleating agent or compatibilizer, as a third component. Particularly, from the viewpoint of improvement in oxygen-absorbing properties, processability and transparency and other viewpoints, the oxidizable polymer or the additive is preferably bonded to the oxygen barrier resin. Note that the above-described bond can be checked by nuclear magnetic resonance, a Fourier transform infrared spectrometer or the like.

In the multilayered container of the present invention, the cooling crystallization peak temperature of the oxygen-absorbing barrier resin composition is lower than that of the base resin (oxygen barrier resin) of the oxygen-absorbing barrier resin composition.

Such a condition of the above-described cooling crystallization peak temperature makes it possible to obtain an oxygen-absorbing barrier resin composition which is excellent in processability, with crystallization thereof during solid-phase forming being prevented or being less frequent.

In addition, the multilayered container of the present invention is solid-phase formed in a temperature range lower by 1 to 15° C. than the cooling crystallization starting temperature (Tc2) of the base resin. With such a molding condition, an amount of heat released which will be described later can be set in an appropriate range, and a multilayered container which has the oxygen-absorbing capability and is excellent in oxygen barrier properties can be obtained. The multilayered container of the present invention is preferably solid-phase formed in a temperature range (T) which is lower by 1 to 15° C. than Tc2, more preferably solid-phase formed in a temperature range lower by 3 to 14° C. than Tc2. In addition, the multilayered container of the present invention is such that, a thermal analysis of the body portion of the container shows that the amount of heat released during isothermal crystallization after a temperature raise from 30° C. to 130° C. at 100° C./min is less than 0.5 J/g. When the amount of heat released is in such a range, it is possible to obtain a multilayered container which is excellent in container appearance and mechanical properties, and which has excellent oxygen barrier properties with oxygen-absorbing capability.

In addition, the multilayered container of the present invention is such that, x-ray diffraction measurement shows that an intensity ratio $I/I_0$ of an intensity (I) of an (110) plane to a baseline ($I_0$) is 4 or more in at least the body portion of the container. When the intensity ratio $I/I_0$ is in such a range, it is possible to obtain a multilayered container which is further excellent in transparency and mechanical properties, and which has excellent oxygen barrier properties with oxygen-absorbing capability. The intensity ratio $I/I_0$ is more preferably 4 to 10.

The multilayered container of the present invention may include an adhesive resin interposed between any adjacent resin layers, if necessary.

Examples of such an adhesive resin include a polymer including a carboxylic acid, a carboxylic anhydride or a carboxylic acid in the main chain or side chains thereof at a concentration of 1 to 700 milliequivalent (meq) per 100 g of resin, preferably 10 to 500 meq per 100 g of resin.

Examples of the adhesive resin include an ethylene-acrylic acid copolymer, an ion-crosslinked olefin copolymer, maleic anhydride grafted polyethylene, maleic anhydride grafted polypropylene, acrylic acid grafted polyolefin, an ethylene-vinyl acetate copolymer, copolymerized polyester, copolymerized polyamide and the like, and the adhesive resin may be a combination of two or more of these resins.

These adhesive resins are useful for lamination by co-extrusion, sandwich lamination or the like. A thermosetting adhesive resin of isocyanate type or epoxy type can also be used.

A layer structure in which the oxygen-absorbing barrier resin composition of the present invention is used can be selected appropriately, depending on the use mode and required function. In particular, a structure having at least one oxygen barrier layer is preferable because the life time of the oxygen absorption layer can be improved.

In a laminated body in which the oxygen-absorbing barrier resin composition of the present invention is used, a deodorant or an adsorbent for oxidation by-products is preferably blended into the oxygen absorption layer or any one of the other layers, particularly a layer inside the oxygen absorption layer, in order to trap by-products generated in oxygen absorption.

Examples of the deodorant and the adsorbent include ones known per se. Specifically, the examples include naturally occurring zeolite, synthetic zeolite, silica gel, active carbon, impregnated active carbon, activated clay, activated aluminum oxide, clay, diatomaceous earth, kaolin, talc, bentonite, sepiolite, attapulgite, magnesium oxide, iron oxide, aluminum hydroxide, magnesium hydroxide, iron hydroxide, magnesium silicate, aluminum silicate, synthetic hydrotalcite and amine-supporting porous silica. Of these, the amine-supporting porous silica is preferable from the viewpoint of reactivity with aldehydes, which are oxidation by-products. A so called high silica zeolite, which has high silica/alumina ratio, is preferable from the viewpoints of exhibiting excellent properties to absorb various oxidation by-products and being transparent.

The silica/alumina ratio (molar ratio) of the high silica zeolite is preferably 80 or more, more preferably 90 or more, further preferably 100 to 700.

In certain highly humid conditions, a zeolite with a low silica/alumina ratio has properties in which absorbability of oxidation by-products is deteriorated. In contrast, in such highly humid conditions, a zeolite with the high silica/alumina ratio has properties in which absorbability of oxidation by-products improve. Accordingly, the zeolite with such a high silica/alumina ratio is particularly effective when used in a package for packaging contents containing water. The exchanged cations of the high silica zeolite need to be one kind of, or a combination of two or more kinds of: alkali metal ions such as sodium, lithium and potassium ions; and alkaline earth metal ions such as calcium and magnesium ions. In this case, one containing at least sodium cations as the exchanged cations is preferable. A particularly preferable example is one in which substantially all exchanged cations are sodium ions.

The multilayered container of the present invention is made of a flange portion, a body portion and a bottom portion. The ratio H/D of the height H to the diameter D of the multilayered container is in the range of preferably 2.0 or less, more preferably 1.6 to 0.8, from the viewpoint of processability.

A packaging container which employs the multilayered structure of the present invention is useful as a container capable of preventing flavor deterioration of the contents due to oxygen.

Examples of contents which can be packaged include contents which easily degrade in the presence of oxygen. Specifically, the examples include: beverages such as beer, wine, fruit juice, carbonated soft drink, oolong tea and green tea; foods such as fruit, nuts, vegetables, meat products, infant food, coffee, jam, mayonnaise, ketchup, edible oil, dressing, various kinds of sauce, foods boiled down in soy or the like, and dairy products; others such as medicines, cosmetics and gasoline; and the like. However, contents which can be packaged are not limited thereto.

EXAMPLES

The present invention will be described in further details on the basis of Examples; however, the present invention is not limited thereto.

1. Determination Methods (1) Solid-Phase Forming in Temperature Range (T) Lower by 1 to 15° C. than Cooling Crystallization Starting Temperature (Tc2) of Base Resin A measurement sample was cut out of the body portion of a multilayered container. The sample was heated from 0° C. to 230° C. at a rate of 10° C./min, held for 5 minutes, and thereafter cooled to 0° C. at a rate of 10° C./min, by using a DSC measurement differential scanning calorimeter (DSC6220: manufactured by Seiko Instruments Inc.), to determine the cooling crystallization starting temperature (Tc2) of a base resin. As a result the temperature was found to be 162° C.

The temperature difference (Tc2)−(T) was found by subtracting a mold temperature (T) from the cooling crystallization starting temperature (Tc2) of 162° C. to check whether or not solid-phase forming was performed in a temperature range (T) lower by 1 to 15° C. than the cooling crystallization starting temperature (Tc2) of 162° C. of the base resin.

(2) Amount of Heat Released During Isothermal Crystallization

A measurement sample was cut out of the body portion of a multilayered container. The sample was heated from 30'C to 130° C. at a rate of 100° C./min and held for 30 minutes, by using a DSC measurement differential scanning calorimeter (DSC6220: manufactured by Seiko Instruments Inc.) to determine the amount of heat released during isothermal crystallization.

(3) X-Ray Diffraction Intensity Ratio $I/I_0$

A measurement sample was taken out of the body portion of a multilayered container. A diffraction profile of the sample was determined by using a micro X-ray diffractometer (PSPC-150C: manufactured by Rigaku corporation). The determination was conducted as follows: x-rays were formed into narrow beams using a collimator; the narrow beams were caused to perpendicularly enter a surface of multiply-stacked sample; the height direction of the container was set to be perpendicular to the plane containing the X-ray optic axis and curved PSPC (intensity of orientation in the height direction); diffraction intensity in a range of Bragg angle 2θ=0 to 100° was accumulated by using the curved PSPC; the diffraction due to air was subtracted from the obtained x-ray diffraction profile; and then the intensity ratio $I/I_0$ was calculated, where the peak intensity at 2θ=14.5° (corresponding to the 110 plane of polypropylene) was designated as I, and the peak intensity at 2θ=15.5 was designated as $I_0$.

2. Evaluation

The appearance of a multilayered container was visually observed to check appearance of the container such as vertical stripe-shaped irregularity (irregularity due to the stretching during molding), surface unevenness, whitening, and evenness in the thickness (unevenness in container thickness), as well as mechanical properties such as impact resistance (drop strength). If such phenomena were not observed in the multilayered container, the multilayered container was marked with o, and if such phenomena were observed in the multilayered container, the multilayered container was marked with x.

Example 1

Base resin (oxygen barrier resin) pellets made of an ethylene-vinyl alcohol copolymer resin (copolymerized with 32 mol % of ethylene) (EP-F171B: KURARAY CO., LTD.) was mixed with a transition metal catalyst of cobalt neodecanoate (cobalt content: 14 wt %) (DICANATE 5000: Dainippon Ink and Chemicals, Incorporated) by using a tumbler. Accordingly, 350 ppm of cobalt neodecanoate in terms of cobalt content was evenly attached onto the surface of the above-described base resin pellets.

Next, by using a twin screw extruder (TEM-35B: TOSHIBA MACHINE CO., LTD) equipped with a strand die at the outlet portion thereof was used to prepare oxygen-absorbing barrier resin composition pellets. The twin screw extruder was operated at screw revolution speed of 100 rpm and was evacuated through a low vacuum vent. Therein, 50 parts by weight of maleic anhydride-modified polybutadiene having an acid number of 40 mg KOH/g (M-2000-20: Nippon Petrochemicals Co., Ltd.) was added dropwise by using a liquid feeder to 950 parts by weight of the base resin with the cobalt attached thereto, and then strands were formed at a mold temperature of 200° C. Thus, oxygen-absorbing barrier resin composition pellets were prepared.

Then, a multilayered sheet of five layers was formed by using three types of resins: a polypropylene resin (EC9J: Japan Polypropylene Corporation); an adhesive resin (AD-MER QF551, Mitsui Chemicals, Inc.); and the oxygen-absorbing barrier resin composition pellets prepared as above.

The structure and thickness of the layers were as follows: polypropylene layer (557 μm)/adhesive resin layer (24 μm)/oxygen-absorbing barrier resin composition layer (38 μm)/adhesive resin layer (24 μm)/polypropylene layer (557 μm). The total thickness of the multilayered sheet is 1200 μm.

The multilayered sheet was cut into a 30 cm square. Then, the sheet was heated to 148° C. with a far-infrared heater, and solid-phase formed into a multilayered container at a drawing ratio H/D=1.3 by using a plug assisted vacuum-pressure forming machine.

The obtained multilayered container was subjected to the determination of the temperature difference (Tc2−T) obtained by subtracting the mold temperature (T) from the cooling crystallization starting temperature (Tc2) of 162° C., of the amount of heat released during isothermal crystallization, and of the x-ray diffraction intensity ratio $I/I_0$, and the evaluation of the container was made.

Example 2

A multilayered container was solid-phase formed in the same manner as Example 1, except that the sheet heating temperature was set to 159° C. Then, the multilayered container was subjected to the determination and the evaluation.

Example 3

A multilayered container was solid-phase formed in the same manner as Example 1, except that the drawing ratio H/D was set to 1.6. Then, the multilayered container was subjected to the determination and the evaluation.

Comparative Example 1

A multilayered container was solid-phase formed in the same manner as Example 1, except that the base resin was used as the intermediate layer. Then, the multilayered container was subjected to the determination and the evaluation.

Comparative Example 2

A multilayered container was solid-phase formed in the same manner as Example 1, except that the base resin was used as the intermediate layer and the sheet heating temperature was set to 158° C. Then, the multilayered container was subjected to the determination and the evaluation.

Comparative Example 3

A multilayered container was tried to be solid-phase formed in the same manner as Example 1, except that the base resin was used as the intermediate layer and the drawing ratio in molding was set to 1.6. However, with this condition, the solid-phase forming failed. Accordingly, neither determination of the amount of heat released during isothermal crystallization and the x-ray diffraction intensity ratio $I/I_0$ nor the evaluation of the container was performed.

Comparative Example 4

A multilayered container was molded in the same manner as Example 1, except that the sheet heating temperature was set to 130° C. Then, the multilayered container was subjected to the determination and the evaluation.

Comparative Example 5

A multilayered container was molded in the same manner as Example 1, except that the base resin was used as the intermediate layer and the sheet heating temperature was set to 130° C. Then, the multilayered container was subjected to the determination and the evaluation.

Comparative Example 6

A multilayered container was molded in the same manner as Example 1, except that the sheet heating temperature was set to 180° C. and the drawing ratio H/D was set to 0.8. Then, the multilayered container was subjected to the determination and the evaluation.

Table 1 shows check results of the temperature differences (Tc2−T) each obtained by subtracting the mold temperature (T) from the cooling crystallization starting temperature (Tc2) of 162° C. as well as the determination results of the amount of heat released during isothermal crystallization and x-ray diffraction intensity ratio $I/I_0$. Table 2 shows evaluation results of the multilayered containers.

As is clear from Table 2, the present invention makes it possible to obtain a multilayered container including an intermediate layer consisting of an oxygen-absorbing barrier resin composition which is excellent in solid-state molding processability. As a result, the multilayered container has excellent container appearance and excellent mechanical properties.

TABLE 1

| | | | Solid state molding | | | | |
| --- | --- | --- | --- | --- | --- | --- | --- |
| | | | Molding conditions | | Cooling | | |
| | Determined portion | Layer structure | Sheet heating temperature (T) (° C.) | Drawing ratio (H/D) | crystallization peak temperature (Tc2) (° C.) | Temperature difference (Tc2 − T) | Amount of heat released during isothermal crystallization | X-ray diffraction intensity ratio ($I/I_0$) |
| Example 1 | Body portion | PP/adhesive/oxygen absorbing material/adhesive/PP | 148° C. | 1.3 | 154° C. | 14° C. | 0.06 | 6.5 |
| Example 2 | Body portion | PP/adhesive/oxygen absorbing material/adhesive/PP | 159° C. | 1.3 | 154° C. | 3° C. | 0.46 | 8.6 |
| Example 3 | Body portion | PP/adhesive/oxygen absorbing material/adhesive/PP | 148° C. | 1.6 | 154° C. | 14° C. | 0.13 | 6.1 |
| Comparative Example 1 | Body portion | PP/adhesive/base material resin/adhesive/PP | 148° C. | 1.3 | 160° C. | 14° C. | 0.09 | 7.9 |
| Comparative Example 2 | Body portion | PP/adhesive/base material resin/adhesive/PP | 158° C. | 1.3 | 160° C. | 4° C. | 0.16 | 9.7 |
| Comparative Example 3 | | PP/adhesive/base material resin/adhesive/PP | 148° C. | 1.6 | — | 14° C. | — | — |
| Comparative Example 4 | Body portion | PP/adhesive/oxygen absorbing material/adhesive/PP | 130° C. | 1.3 | 154° C. | 32° C. | 0.00 | 7.6 |
| Comparative Example 5 | Body portion | PP/adhesive/base material resin/adhesive/PP | 130° C. | 1.3 | 160° C. | 32° C. | 0.07 | 9.4 |
| Comparative Example 6 | Body portion | PP/adhesive/oxygen absorbing material/adhesive/PP | 180° C. | 0.8 | 154° C. | −18° C. | 0.52 | 3.1 |

TABLE 2

| | Solid-state molding | | | | |
|---|---|---|---|---|---|
| | Evaluation | | | | |
| | Container appearance | | | | Mechanical characteristics impact resistance (drop strength) |
| | Vertical stripe-shaped irregularity | Unevenness in container surface | Whitening | evenness in the thickness | |
| Example 1 | ○ | ○ | ○ | ○ | ○ |
| Example 2 | ○ | ○ | ○ | ○ | ○ |
| Example 3 | ○ | ○ | ○ | ○ | ○ |
| Comparative Example 1 | x | x | ○ | ○ | ○ |
| Comparative Example 2 | x | x | ○ | ○ | ○ |
| Comparative Example 3 | — | — | — | — | — |
| Comparative Example 4 | ○ | ○ | x | x | ○ |
| Comparative Example 5 | ○ | ○ | x | x | ○ |
| Comparative Example 6 | ○ | ○ | ○ | ○ | x |

What is claimed is:

1. A method of forming a multilayered container made of a flange portion, a body portion and a bottom portion comprising:
   providing an inner layer comprising an olefin resin;
   providing an outer layer comprising an olefin resin;
   blending an oxidizable polymer having unsaturated ethylenic bonds with a base resin to form an oxygen-absorbing barrier resin composition;
   providing an intermediate layer between the inner layer and the outer layer, wherein said intermediate layer consists of said oxygen-absorbing barrier resin composition; and
   forming a solid-phase multilayered container by using a plug assisted vacuum-pressure forming machine in a temperature range which is 148 to 159° C.;
   wherein the olefin resin is selected from the group consisting of polypropylene (PP), an ethylene-propylene copolymer, and a blend thereof;
   wherein the base resin is an ethylene-vinyl alcohol copolymer resin;
   wherein a cooling crystallization peak temperature of the oxygen-absorbing barrier resin composition is lower than that of the base resin (an oxygen barrier resin) of the oxygen-absorbing barrier resin composition;
   wherein a thermal analysis of a body portion of the container shows that an amount of heat released during isothermal crystallization after a temperature raise from 30° C. to 130° C. at 100° C./min and held for 30 minutes is less than 0.5 J/g; and
   wherein x-ray diffraction measurement shows that an intensity ratio $I/I_0$ of an intensity (I) of an (110) plane to a baseline ($I_0$) is 4 to 10 in at least the body portion of the container.

2. The method of claim 1, further comprising including an oxidation catalyst in the oxygen-absorbing barrier resin composition.

3. The method of claim 1, wherein
   an amount of the oxidizable polymer having unsaturated ethylenic bonds is in the range of 1 to 30% by weight relative to the total weight of the oxygen-absorbing barrier resin composition.

4. The method of claim 2, wherein
   an amount of the oxidation catalyst is in the range of 100 to 1000 ppm relative to the total weight of the oxygen-absorbing barrier resin composition.

* * * * *

UNITED STATES PATENT AND TRADEMARK OFFICE
CERTIFICATE OF CORRECTION

PATENT NO. : 9,956,716 B2
APPLICATION NO. : 14/523843
DATED : May 1, 2018
INVENTOR(S) : Takayuki Ishihara et al.

Page 1 of 6

It is certified that error appears in the above-identified patent and that said Letters Patent is hereby corrected as shown below:

On the Title Page

Item (57) ABSTRACT, replace:
"(57) ABSTRACT
Disclosed is a multilayered container having an intermediate layer comprising an oxygen-absorbable barrier resin composition showing excellent processability upon molding. Specifically disclosed is a multilayered container which comprises an inner layer and an outer layer each comprising an olefin resin and an intermediate layer provided between the inner layer and the outer layer and comprising an oxygen-absorbable barrier resin composition, wherein the oxygen-absorbable barrier resin composition has a cooling crystallization peak temperature lower than that of a base resin (an oxygen barrier resin) which constitutes the oxygen-absorbable barrier resin composition, the multilayered container is formed by a solid-phase-forming process at a temperature lower by 1 to 15° C. than the cooling crystallization starting temperature (Tc2) of the base resin, and the body of the container shows a calorific value of less than 0.5 J/g by the isothermal crystallization after heating from 30° C. to 130° C. at a heating rate of 100° C./min in a thermal analysis of the body."
With:
-- (57) ABSTRACT
Disclosed is a multilayered container having an intermediate layer comprising an oxygen-absorbable barrier resin composition showing excellent processability upon molding. Specifically disclosed is a multilayered container which comprises an inner layer and an outer layer each comprising Signed and Sealed this
Ninth Day of April, 2019

Andrei Iancu
*Director of the United States Patent and Trademark Office* an olefin resin and an intermediate layer provided between the inner layer and the outer layer and comprising an oxygen-absorbable barrier resin composition, wherein the oxygen-absorbable barrier resin composition has a cooling crystallization peak temperature lower than that of a base resin (an oxygen barrier resin) which constitutes the oxygen-absorbable barrier resin composition, the multilayered container is formed by a solid-phase forming process at a temperature lower by 1 to 15° C. than the cooling crystallization starting temperature (Tc2) of the base resin, and the body of the container shows a calorific value of less than 0.5 J/g by the isothermal crystallization after heating from 30° C. to 130° C. at a heating rate of 100° C./min in a thermal analysis of the body. --.

In the Specification

Column 2, Line 57, replace "Examples of the aminocarboxylic acid component include" with -- Examples of the aminocarboxylic acid component include: --.

Column 3, Line 31, replace "the polyamide resin have close relationship to each other." with -- the polyamide resin have a close relationship to each other. --.

Column 3, Line 61, replace "This polyester needs to have a molecular weight at least" with -- This polyester needs to have a molecular weight of at least --.

Column 9, Line 39, replace "was designated as I, and the peak intensity at 2θ=15.5 was" with -- was designated as I, and the peak intensity at 2θ = 15.5° was --.

Columns 11-12, TABLE 1, replace:

"

TABLE 1

| | | | Solid state molding | | | | | |
| --- | --- | --- | --- | --- | --- | --- | --- | --- |
| | | | Molding conditions | | Cooling | | | |
| | Determined portion | Layer structure | Sheet heating temperature (T) (°C.) | Drawing ratio (H/D) | crystallization peak temperature (Tc2) (°C.) | Temperature difference (Tc2 − T) | Amount of heat released during isothermal crystallization | X-ray diffraction intensity ratio (I/I₀) |
| Example 1 | Body portion | PP/adhesive/oxygen absorbing material/adhesive/PP | 148° C. | 1.3 | 154° C. | 14° C. | 0.06 | 6.5 |
| Example 2 | Body portion | PP/adhesive/oxygen absorbing material/adhesive/PP | 159° C. | 1.3 | 154° C. | 3° C. | 0.46 | 8.6 |
| Example 3 | Body portion | PP/adhesive/oxygen absorbing material/adhesive/PP | 148° C. | 1.6 | 154° C. | 14° C. | 0.13 | 6.1 |
| Comparative Example 1 | Body portion | PP/adhesive/base material resin/adhesive/PP | 148° C. | 1.3 | 160° C. | 14° C. | 0.09 | 7.9 |
| Comparative Example 2 | Body portion | PP/adhesive/base material resin/adhesive/PP | 158° C. | 1.3 | 160° C. | 4° C. | 0.16 | 9.7 |
| Comparative Example 3 | | PP/adhesive/base material resin/adhesive/PP | 148° C. | 1.6 | — | 14° C. | — | — |
| Comparative Example 4 | Body portion | PP/adhesive/oxygen absorbing material/adhesive/PP | 130° C. | 1.3 | 154° C. | 32° C. | 0.00 | 7.6 |
| Comparative Example 5 | Body portion | PP/adhesive/base material resin/adhesive/PP | 130° C. | 1.3 | 160° C. | 32° C. | 0.07 | 9.4 |
| Comparative Example 6 | Body portion | PP/adhesive/oxygen absorbing material/adhesive/PP | 180° C. | 0.8 | 154° C. | −18° C. | 0.52 | 3.1 |

"

With:

TABLE 1

Solid state molding

| | Determined portion | Layer structure | Molding conditions | | Cooling crystallization peak temperature (Tc2) (°C) | Temperature difference (Tc2−T) | Amount of heat released during isothermal crystallization | X-ray diffraction intensity ratio (I/I₀) |
|---|---|---|---|---|---|---|---|---|
| | | | Sheet heating temperature (T) (°C) | Drawing ratio (H/D) | | | | |
| Example 1 | Body portion | PP/adhesive/oxygen absorbing material/adhesive/PP | 148°C | 1.3 | 154°C | 14°C | 0.06 | 6.5 |
| Example 2 | Body portion | PP/adhesive/oxygen absorbing material/adhesive/PP | 159°C | 1.3 | 154°C | 3°C | 0.46 | 8.6 |
| Example 3 | Body portion | PP/adhesive/oxygen absorbing material/adhesive/PP | 148°C | 1.6 | 154°C | 14°C | 0.13 | 6.1 |
| Comparative Example 1 | Body portion | PP/adhesive/base material resin/adhesive/PP | 148°C | 1.3 | 160°C | 14°C | 0.09 | 7.9 |
| Comparative Example 2 | Body portion | PP/adhesive/base material resin/adhesive/PP | 158°C | 1.3 | 160°C | 4°C | 0.16 | 9.7 |
| Comparative Example 3 | | PP/adhesive/base material resin/adhesive/PP | 148°C | 1.6 | ------ | 14°C | ------ | ------ |
| Comparative Example 4 | Body portion | PP/adhesive/oxygen absorbing material/adhesive/PP | 130°C | 1.3 | 154°C | 32°C | 0.00 | 7.6 |
| Comparative Example 5 | Body portion | PP/adhesive/base material resin/adhesive/PP | 130°C | 1.3 | 160°C | 32°C | 0.07 | 9.4 |
| Comparative Example 6 | Body portion | PP/adhesive/oxygen absorbing material/adhesive/PP | 180°C | 0.8 | 154°C | −18°C | 0.52 | 3.1 |

--                                                                                                                            --.

Column 13, TABLE 2, replace:

"
| | TABLE 2 | | | | |
| --- | --- | --- | --- | --- | --- |
| | Solid-state molding | | | | |
| | Evaluation | | | | |
| | Container appearance | | | | Mechanical |
| | Vertical stripe-shaped ir-regularity | Uneven-ness in container surface | Whiten-ing | evenness in the thickness | characteristics impact resist-ance (drop strength) |
| Example 1 | ○ | ○ | ○ | ○ | ○ |
| Example 2 | ○ | ○ | ○ | ○ | ○ |
| Example 3 | ○ | ○ | ○ | ○ | ○ |
| Comparative Example 1 | × | × | ○ | ○ | ○ |
| Comparative Example 2 | × | × | ○ | ○ | ○ |
| Comparative Example 3 | — | — | — | — | — |
| Comparative Example 4 | ○ | ○ | × | × | ○ |
| Comparative Example 5 | ○ | ○ | × | × | ○ |
| Comparative Example 6 | ○ | ○ | ○ | ○ | × |

"

With:

TABLE 2

Solid-state molding

| | Evaluation | | | | |
|---|---|---|---|---|---|
| | Container appearance | | | | Mechanical characteristics |
| | Vertical stripe-shaped irregularity | Unevenness in container surface | Whitening | evenness in the thickness | impact resistance (drop strength) |
| Example 1 | ○ | ○ | ○ | ○ | ○ |
| Example 2 | ○ | ○ | ○ | ○ | ○ |
| Example 3 | ○ | ○ | ○ | ○ | ○ |
| Comparative Example 1 | × | × | ○ | ○ | ○ |
| Comparative Example 2 | × | × | ○ | ○ | ○ |
| Comparative Example 3 | ----- | ----- | ----- | ----- | ----- |
| Comparative Example 4 | ○ | ○ | × | × | ○ |
| Comparative Example 5 | ○ | ○ | × | × | ○ |
| Comparative Example 6 | ○ | ○ | ○ | ○ | × |

-- --.